US009550637B2

(12) United States Patent
DiNello

(10) Patent No.: US 9,550,637 B2
(45) Date of Patent: Jan. 24, 2017

(54) DEVICE FOR STABILIZING A PALLET

(71) Applicant: Intelligrated Headquarters, LLC, Mason, OH (US)

(72) Inventor: Anthony V. DiNello, Plainfield, IL (US)

( * ) Notice: Subject to any disclaimer, the term of this patent is extended or adjusted under 35 U.S.C. 154(b) by 0 days.

(21) Appl. No.: 14/266,915

(22) Filed: May 1, 2014

(65) Prior Publication Data

US 2014/0328661 A1  Nov. 6, 2014

Related U.S. Application Data

(60) Provisional application No. 61/817,895, filed on May 1, 2013.

(51) Int. Cl.
| | | |
|---|---|---|
| *C09J 7/02* | (2006.01) | |
| *B32B 3/10* | (2006.01) | |
| *B65G 57/00* | (2006.01) | |
| *B65D 79/02* | (2006.01) | |
| *B65D 71/00* | (2006.01) | |
| *B65B 61/20* | (2006.01) | |
| *B65B 11/02* | (2006.01) | |
| *F16B 11/00* | (2006.01) | |

(52) U.S. Cl.
CPC ........... *B65G 57/005* (2013.01); *B65B 11/025* (2013.01); *B65B 61/207* (2013.01); *B65D 71/0085* (2013.01); *B65D 71/0088* (2013.01); *B65D 79/02* (2013.01); *F16B 11/006* (2013.01); *Y10S 206/813* (2013.01)

(58) Field of Classification Search
CPC .......... B65C 1/021; B65C 9/1884; B65C 9/36; B65C 9/42; B65C 2009/0003; B65C 9/1826; Y10T 156/171; Y10T 156/1768; Y10T 428/28; B65D 71/0088; B65D 71/0085; B65D 19/38; B65D 21/0224; B65D 63/1009; B65B 17/02; B65B 11/585; B65B 13/02; B65B 35/50; B65B 61/025; B65G 57/00; B65G 57/06; Y10S 206/813
USPC ......... 156/537, 540, 541, 542, 556, 60, 931, 156/DIG. 1, DIG. 2, DIG. 28, DIG. 33, 156/DIG. 5,156/DIG. 9; 206/516, 586, 206/821; 229/120.011; 414/789.5, 791.6, 414/794.2, 799; 428/195.1, 343, 64.1; 53/157

See application file for complete search history.

(56) References Cited

U.S. PATENT DOCUMENTS

| | | | | | |
|---|---|---|---|---|---|
| 2,578,583 | A | * | 12/1951 | O'Brien | 206/460 |
| 3,585,777 | A | * | 6/1971 | Pesch | 53/397 |
| 3,903,673 | A | * | 9/1975 | Grasvoll | 53/535 |
| RE30,419 | E | * | 10/1980 | Crankshaw et al. | 156/249 |
| 4,618,392 | A | * | 10/1986 | Uchimura et al. | 156/384 |

(Continued)

FOREIGN PATENT DOCUMENTS

| | | | | | |
|---|---|---|---|---|---|
| DE | | 3538119 A | * | 4/1987 | | B65B 17/02 |
| DE | 102008059376 A1 | * | 10/2009 | | B65B 17/02 |

(Continued)

OTHER PUBLICATIONS

International Search Report and Written Opinion dated Sep. 15, 2014 for Application No. PCT/US2014/036348.

*Primary Examiner* — Gregory Adams

(57) ABSTRACT

A device for palletizing a plurality of articles and for stabilizing selected ones of the plurality of articles is provided. The device includes at least one load stabilizer and at least one stabilizer applier. The at least one load stabilizer includes a stabilizer sheet and an adhesive layer coupled with the stabilizer sheet. The at least one stabilizer applier (Continued)

receives the at least one load stabilizer and applies the adhesive layer to a select potential shift point of a palletized load.

18 Claims, 7 Drawing Sheets

(56) References Cited

U.S. PATENT DOCUMENTS

| | | | | |
|---|---|---|---|---|
| 4,897,980 | A * | 2/1990 | Geyser et al. | B65B 5/028 |
| | | | | 53/128.1 |
| 5,040,461 | A * | 8/1991 | Van-Ocker | 101/288 |
| 5,227,002 | A * | 7/1993 | Faust et al. | 156/468 |
| 5,232,540 | A * | 8/1993 | Southwell et al. | 156/361 |
| 5,269,645 | A | 12/1993 | Winski | |
| 5,339,957 | A * | 8/1994 | Carstens | 206/386 |
| 5,351,461 | A * | 10/1994 | Fandard et al. | 53/157 |
| 5,491,956 | A * | 2/1996 | Donnelly et al. | 53/399 |
| 5,496,599 | A * | 3/1996 | Schwartz et al. | 428/35.7 |
| 5,674,335 | A * | 10/1997 | Aman et al. | 156/64 |
| 5,844,807 | A * | 12/1998 | Anderson et al. | 700/217 |
| 6,009,926 | A * | 1/2000 | Vicktorius et al. | 156/556 |
| 6,080,250 | A * | 6/2000 | Urban et al. | 156/64 |
| 6,451,149 | B1 * | 9/2002 | McKenney et al. | 156/238 |
| 6,634,400 | B2 * | 10/2003 | Barbosa | 156/384 |
| 6,668,892 | B2 * | 12/2003 | Vasilakes et al. | 156/387 |
| 7,185,689 | B2 * | 3/2007 | Jenkins et al. | 156/540 |
| 7,670,100 | B2 | 3/2010 | Hannen et al. | |
| 7,802,600 | B2 * | 9/2010 | Kobayashi | 156/387 |
| 8,465,249 | B2 | 6/2013 | Zahn | |
| 2007/0193681 | A1 * | 8/2007 | Smith et al. | 156/277 |
| 2007/0209755 | A1 * | 9/2007 | Smith | 156/249 |
| 2010/0200159 | A1 * | 8/2010 | Le | 156/277 |
| 2011/0142588 | A1 | 6/2011 | Zahn | |
| 2012/0273387 | A1 * | 11/2012 | Ivosevic et al. | 206/597 |

FOREIGN PATENT DOCUMENTS

| | | |
|---|---|---|
| EP | 1657191 | 5/2006 |
| EP | 1657191 A1 | 5/2006 |
| WO | WO 2010/099809 | 9/2010 |
| WO | WO 2010-099809 A1 | 9/2010 |

* cited by examiner

US 9,550,637 B2

DEVICE FOR STABILIZING A PALLET

PRIORITY

This application claims priority to U.S. Provisional Patent Application Ser. No. 61/817,895, filed May 1, 2013, entitled "Device for Stabilizing a Pallet," the disclosure of which is incorporated by reference herein.

BACKGROUND

The present disclosure relates generally to palletizing and palletizing loads for transit and is more particularly directed to a device that applies a load stabilizer to articles, containers, or cartons that are stacked onto a pallet for transit. The innovation will be disclosed in connection with, but not necessarily limited to, a device that applies a load stabilizer onto potential shift points of a palletized load and more particularly to a device that places an adhesive load stabilizer at potential shift points of the palletized load.

When articles are stacked one on top of the other, the higher the stack, the greater the tendency for the stack to fall over when subjected to a disturbance such as a transit or shipping load. When layers of articles are stacked on a pallet to create a palletized load for transit, the load has better stability due to contact between adjacent articles, but the load still suffers from height instability issues and the articles positioned on the outside columns can fall outwards unless stabilized.

When articles are palletized for transit in a commercially available palletizing machine, the palletized loading process can encounter the same column height and outside column stability issues. Previous solutions have included placing layer sized sheets of cardboard between layers, but these require large feeding and placement mechanisms in areas that compete for space, and require costly cardboard sheets.

Thus, there is a need for devices and methods to conveniently stabilize palletized loads with smaller mechanisms that eliminate the need for large and costly feeding and placement mechanisms.

BRIEF DESCRIPTION OF THE DRAWINGS

The accompanying drawings illustrate embodiments, and, together with the specification, including the detailed description which follows, serve to explain the principles of the present innovation.

DETAILED DESCRIPTION

Figure 1:
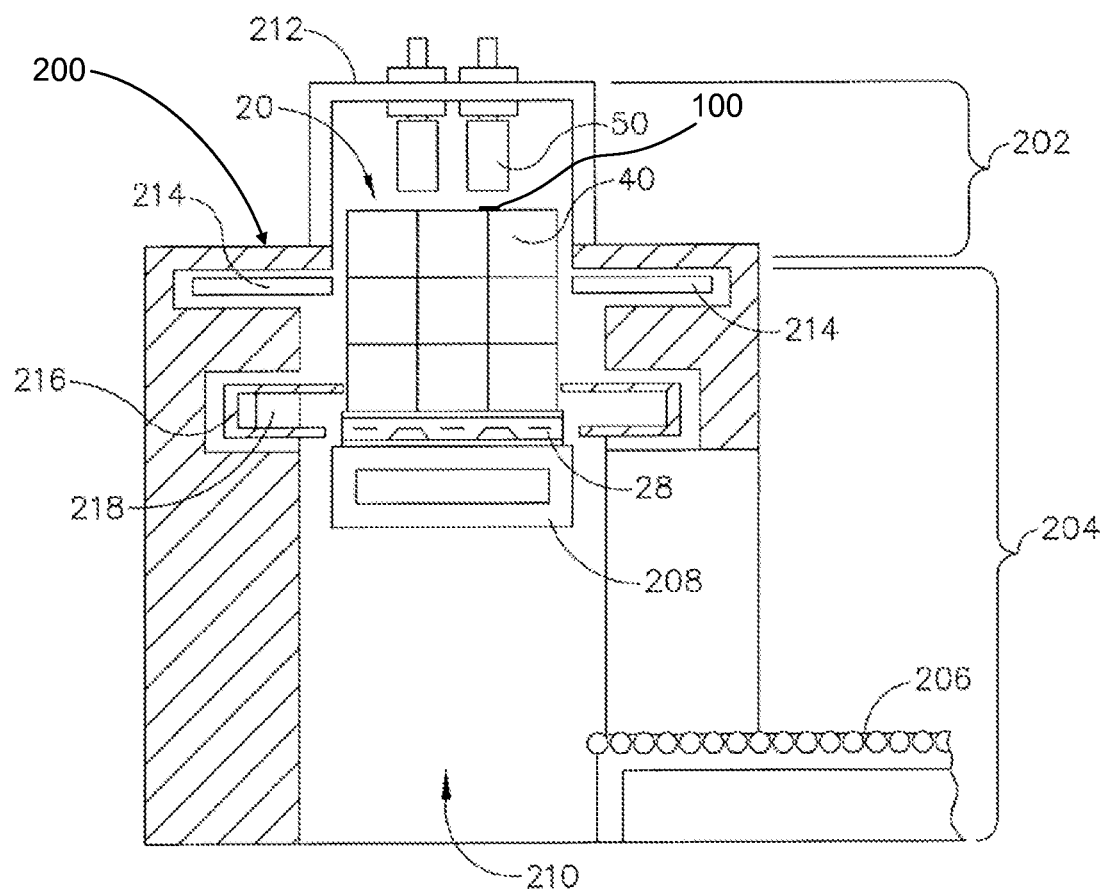
FIG. 1 is a partial cross sectional view of an example automatic palletizer.

In the following description, like reference characters designate like or corresponding parts throughout the several views. Also, in the following description, it is to be understood that terms such as front, back, inside, outside, and the like are words of convenience and are not to be construed as limiting terms. Terminology used in this patent is not meant to be limiting insofar as devices described herein, or portions thereof, may be attached or utilized in other orientations.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference.

FIG. 1 shows a partial cross sectional view of automatic palletizer 200, such as the Alvey® 910 palletizer sold by Intelligrated located at 7901 Innovation Way, Mason, Ohio 45040. Palletizer 200 of the present example is a multi-story unit comprising upper level 202 for receiving and aligning a plurality of articles 40 and lower level 204 for discharging articles 40 as palletized load 20 via discharge conveyor 206. A feed conveyor not shown feeds individual articles 40 into upper level 202 of palletizer 200 for palletizing. Palletizer 200 comprises elevator 208 movable within elevator shaft 210. Elevator 208 is driven within elevator shaft 210 by elevator drive not shown that can be chain or hydraulic driven. In the present example, elevator 208 is centrally located within elevator shaft 210 and is configured to move vertically within elevator shaft 210. In other versions, elevator 208 is offset within elevator shaft 210. In still other versions, elevator 208 moves in other suitable directions e.g., horizontally, obliquely, etc. within elevator shaft 210. Still other suitable configurations for elevator 208 and/or elevator shaft 210 will be apparent to one with ordinary skill in the art in view of the teachings herein.

Figure 8:
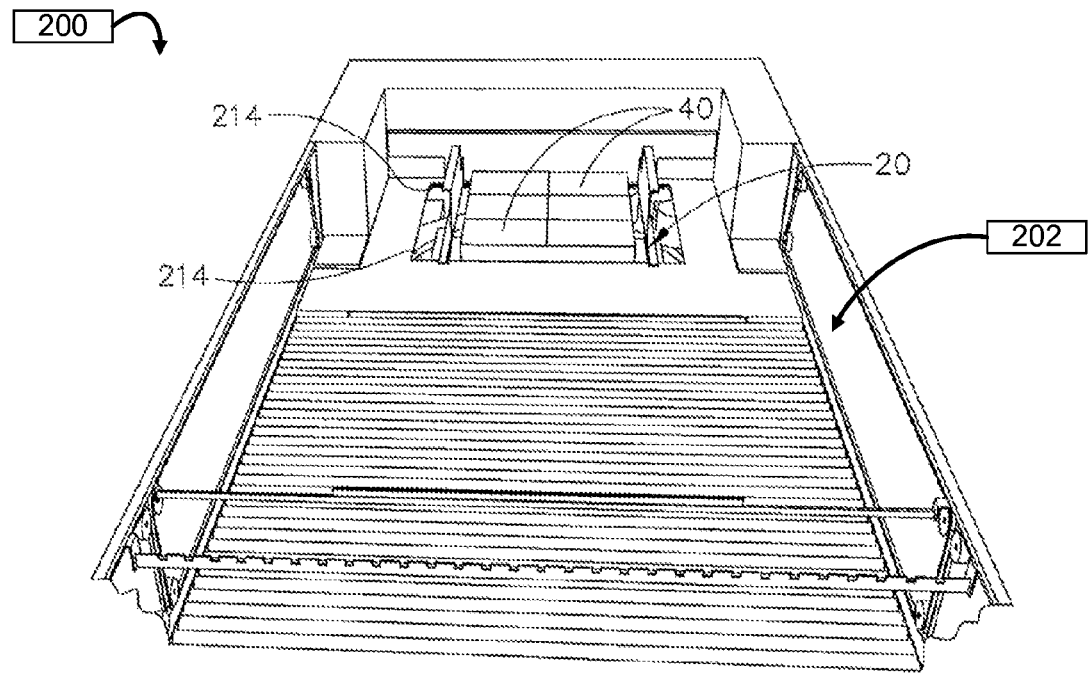
FIG. 8 is an isometric view of the automatic palletizer of FIG. 1 showing the doors in an open position to drop the outer portion of articles onto the palletized load.

Elevator 208 is configured to receive pallet 28 and to move up and down as sequential layers of articles 40 are discharged from upper level 202 and stacked on top of pallet 28 to create palletized load 20. As shown in FIG. 1, upper level 202 is separated from lower level 204 by a pair of movable doors 214. In the present example, doors 214 are positioned at a top portion of elevator shaft 210. Doors 214 are nominally positioned in a closed position not shown to receive a layer of articles 40 thereon (see FIG. 6). Once a layer of articles 40 is positioned on doors 214, doors translate outwardly to an open position, as shown in FIGS. 1 and 8, to discharge the layer of aligned articles 40 onto an empty pallet 28 or palletized load 20 located beneath doors 214.

Wrap ring 216 is positioned within lower level 204 and is motor driven to rotate about elevator shaft 210. Wrap ring 216 is shown sectioned and includes a roll of pallet wrap 218. Accordingly, when actuated, wrap ring 216 is configured to wrap palletized load 20 by rotating around palletized load 20 as palletized load 20 is moved up and down in elevator shaft 210. Wrap ring 216 thereby wraps the sides of palletized load 20 with pallet wrap 218 to stabilize the outer columns of palletized load 20. While wrap ring 216 of the present example includes a circular configuration, other suitable configurations for wrap ring 216 will be apparent to one with ordinary skill in the art in view of the teachings herein.

Upper level 202 of automatic palletizer 200 further comprises stabilizer appliers 50 supported by framework 212 of automatic palletizer 200 and positioned above palletized load 20 to place at least one adhesive load stabilizer 100 onto a top surface of palletized load 20. Load stabilizers 100 thereby hold articles 40 of palletized load 20 together to thereby decrease stability issues within palletized load 20. Stabilizer appliers 50 can place load stabilizers 100 on the uppermost layer of articles 40 on palletized load 20, or stabilizer appliers 50 can place load stabilizers 100 on top of each layer of articles 40 within palletized load 20. Alternatively, stabilizer appliers 50 can place load stabilizers 100 on a side surface of articles 40 of palletized load 20. This can be in addition to or instead of using pallet wrap 218. Still other suitable configurations for stabilizer appliers 50 and/or load stabilizers will be apparent to one with ordinary skill in the art in view of the teachings herein.

Figure 2:
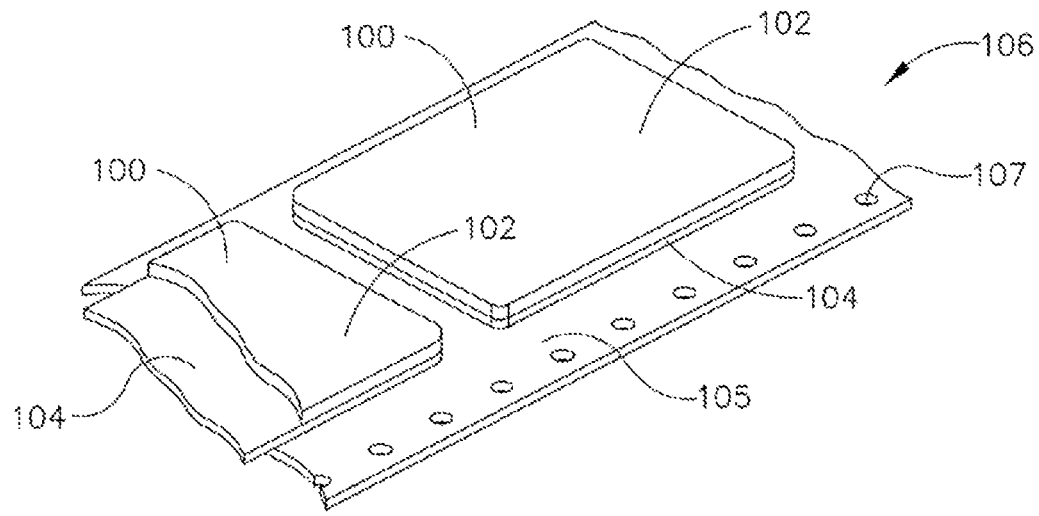
FIG. 2 is a fragmentary isometric view of at least one load stabilizer of the automatic palletizer of FIG. 1 mounted on a release liner.

FIG. 2 is a fragmentary isometric view of load stabilizer 100 used to secure palletized load 20 for transit. Load stabilizers 100 are operably configured to remain secured to palletized load 20 during transit, yet allow articles 40 on palletized load 20 to be easily separated when depalletized. As shown in FIG. 2, load stabilizer 100 comprises stabilizer sheet 102 and adhesive layer 104 attached thereto. Stabilizer sheet 102 is non-adhesive. In some versions, stabilizer sheet 102 is a tearable or frangible material, such as paper. In other versions, stabilizer sheet 102 is formed from Tyvek, plastic film, fibrous material, foam, elastomerics, or other suitable materials. Stabilizer sheet 102 can be cut, perforated, or scored to provide lines of easy tearing in certain directions such as those found during depalletizing. Adhesive layer 104 comprises a releasable adhesive such as the low tack adhesive used on Post-It® Notes. Load stabilizers 100 can be opaque, transparent, or translucent.

Adhesive layer 104 of load stabilizer 100 is positioned on release liner 105. The portion of release liner 105 coupled to adhesive layer 104 is formed from a wax or other slick material to provide protection of adhesive layer 104 until release liner 105 is removed prior to the application of load stabilizer 100 to palletized load 20. FIG. 2 shows release liner 105 as elongated strip 106 to receive a plurality of load stabilizers 100. Alternatively, release liner 105 can be individual sheets applied to a single load stabilizer 100. In the present example, load stabilizers 100 are spaced equally along the length of elongated strip 106 of release liner 105 for sequential feeding and release of a plurality of load stabilizers 100. Release liner 105 is perforated with rows of equally spaced holes 107 to engage drive pins not shown within stabilizer applier 50 for driving and control of release liner 105. Still other suitable configurations for load stabilizers will be apparent to one with ordinary skill in the art in view of the teachings herein.

Figure 3:
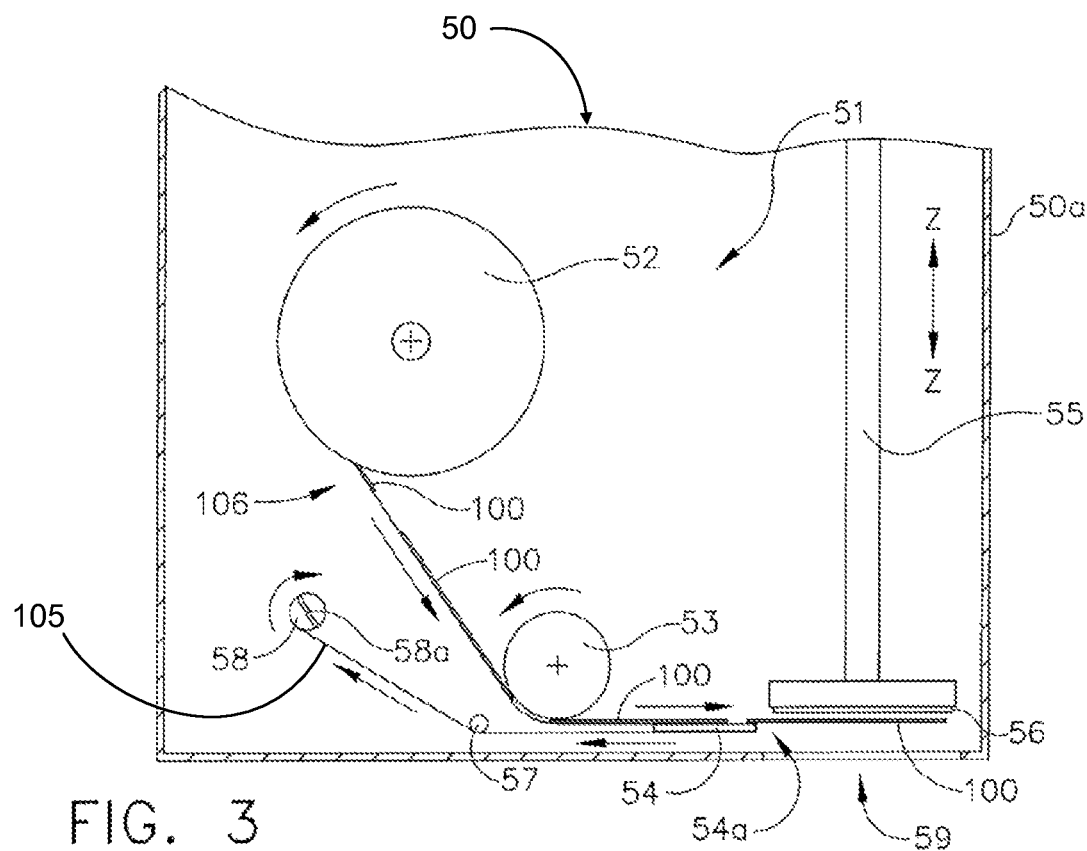
FIG. 3 is a partial cross sectional view of a load stabilizer applier of the automatic palletizer of FIG. 1.

FIG. 3 shows a partial cross section of stabilizer applier assembly 50. FIG. 3 illustrates stabilizer applier assembly 50 as a motorized system that uses the above described elongated strip 106 configuration of release liner 105 to store and dispense load stabilizers 100. Stabilizer applier assembly 50 includes feeder configured to feed load stabilizers 100 to stabilizer applier 55. Arrows are provided to show the feed path of elongated strip 106 of release liner 105 and load stabilizers 100 through feeder 51. In the present example, feeder 51 comprises feed roll 52, idler pulley 53, peel bar 54, liner guide 57, and drive pulley 58 positioned within exterior case 50a. Feed roll 52 is rotatably attached to exterior case 50a and is configured to store a wrapped roll of elongated strip 106 of release liner 105 with load stabilizers 100. Elongated strip 106 is fed from feed roll 52 to wrap around idler pulley 53, which is rotatably attached to exterior case 50a. Idler pulley 53 is positioned below feed roll 52. Idler pulley 53 is configured to contact and rotate with load stabilizer 100 side of elongated strip 106. Elongated strip 106 is then fed to peel bar 54, which is fixed to exterior case 50a. Elongated strip 106 passes along a top surface of peel bar 54 and then bends 180 degrees around end 54a of peel bar 54. As elongated strip 106 bends around peel bar 54, the stiffer load stabilizer 100 peels away from elongated strip 106. When elongated strip 106 of release liner 105 pulls farther around peel bar 54, more of load stabilizer 100 peels from liner 105 and hangs in the air, as shown in FIG. 3.

Stabilizer applier 55 is configured to receive load stabilizer 100 from feeder 51. Stabilizer applier 55 is disposed adjacent to peel bar 54 and comprises a vacuum pad 56 to receive the peeled load stabilizer 100. With vacuum applied to vacuum pad 56, load stabilizer 100 is held against vacuum pad 56. In the present example, stabilizer applier 55 is movable to extend outwardly through opening 59 of exterior case 50a to place load stabilizer 100 against palletized load 20. Stabilizer applier 55 is then retracted back within exterior case 50a to receive the next load stabilizer 100. Stabilizer applier 55 is reciprocated up and down by a motor (not shown). Other suitable configurations for operating stabilizer applier 55 will be apparent to one with ordinary skill in the art in view of the teachings herein.

Once load stabilizer 100 is peeled from elongated strip 106, elongated strip 106 passes around liner guide 57 and wraps around drive pulley 58. Accordingly, idler pulley 53 and liner guide 57 are positioned adjacent peel bar 54 to maintain the alignment of elongated strip 106 relative to peel bar 54. Drive pulley 58 is rotatably driven by a motor (not shown) to wrap elongated strip 106 around drive pulley 58. Drive pulley 58 includes a release liner engagement feature such as slot 58a that is configured to engage with and pull on a free end of release liner 105 as drive pulley 58 rotates. Accordingly, drive pulley 58 rotates to thereby rotate liner guide 57, idler pulley 53, and feed roll 52 to pull elongated strip 106 from feed roll 52 to drive pulley 58. Drive pulley 58 thereby wraps the empty elongated strip 106 onto drive pulley 58. FIG. 3 shows drive pulley 58 rotating in a clockwise direction, driven by a drive motor (not shown) located on a back side of the case 50a. Other configurations for stabilizer applier 50 will be apparent to one with ordinary skill in the art in view of the teachings herein.

Figure 4:
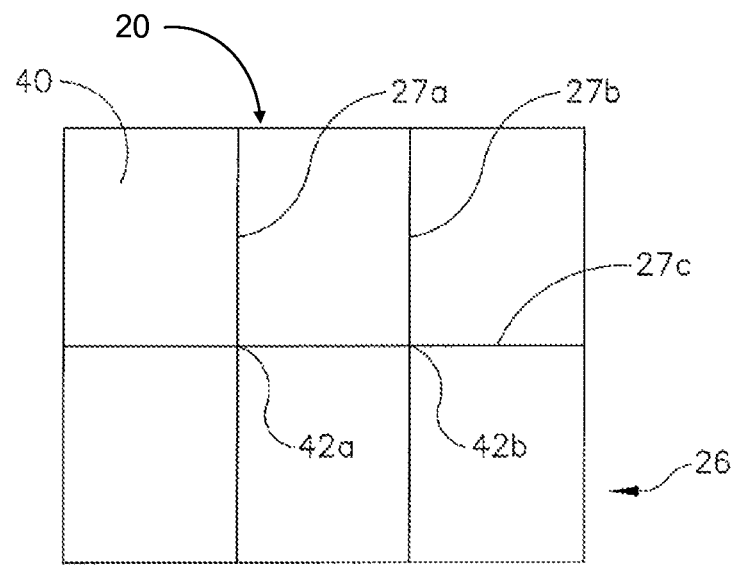
FIG. 4 is a top view of a palletized load shown in FIG. 1.

FIG. 4 is a top view of palletized load 20 showing top surface 26 of palletized load 20. Palletized load 20 includes a plurality of contact lines 27a, 27b, 27c where two or more adjacent articles 40 contact each other. Articles 40 contact at each of contact lines 27a, 27b, 27c, and in this example, cross at intersection points 42a, 42b. Each one of contact lines 27a, 27b, 27c and intersection points 42a, 42b represent potential shift points that can allow articles 40 to separate or shift away from adjacent articles 40 of palletized load 20 under transit. This can destabilize palletized load 20.

Figure 5:
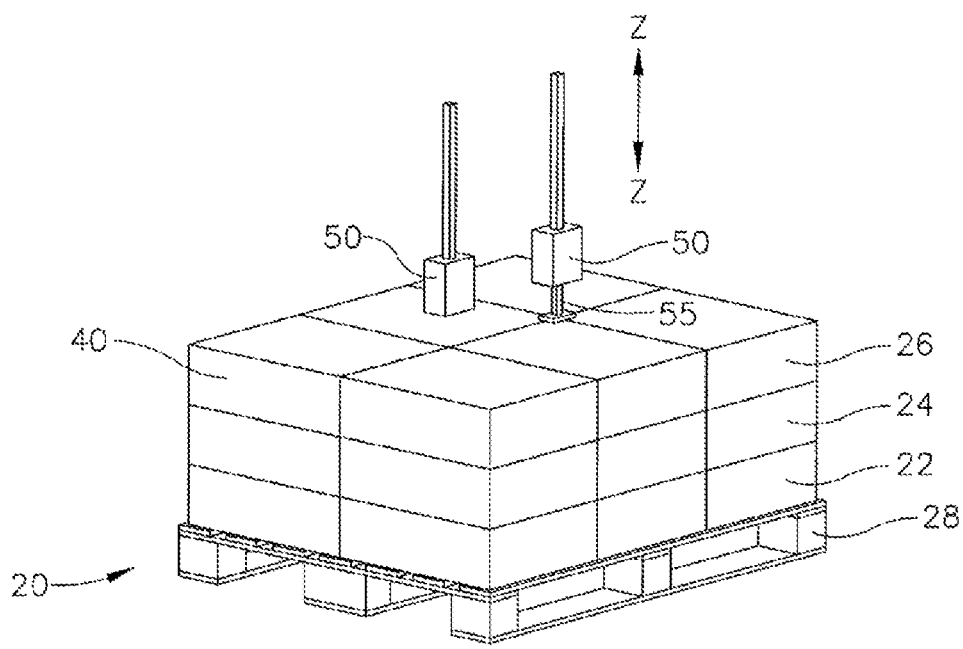
FIG. 5 is an isometric view of the palletized load shown in FIG. 1.

FIG. 5 is an isometric view of palletized load 20, which comprises layers 22, 24, 26 of articles 40 stacked on top of pallet 28. Articles 40 of the present example are placed three wide and two long on each layer 22, 24, 26. Of course, other suitable combinations for layers 22, 24, 26 will be apparent to one with ordinary skill in the art in view of the teachings herein. Once a predetermined number of layers 22, 24, 26 of articles 40 have been received on palletized load 20, stabilizer appliers 50 place load stabilizers 100 to one or more potential shift points of articles 40 of palletized load 20 to provide transit stability. For example, as shown in FIG. 5, a first stabilizer applier 50 is positioned above uppermost layer 26 of palletized load 20 and a second stabilizer applier 50 is shown with stabilizer applier 55 extended along axis Z-Z to apply load stabilizer 100 onto palletized load 20. While FIG. 5 shows two stabilizer appliers 50, any suitable number of stabilizer appliers 50 can be used to apply any suitable number of load stabilizers 100. FIG. 5 further shows that load stabilizer 100 is sized to cover a portion of the top surface of palletized load 20. In other versions, load stabilizer 100 is sized to cover an entire surface of palletized load 20.

Figure 6:
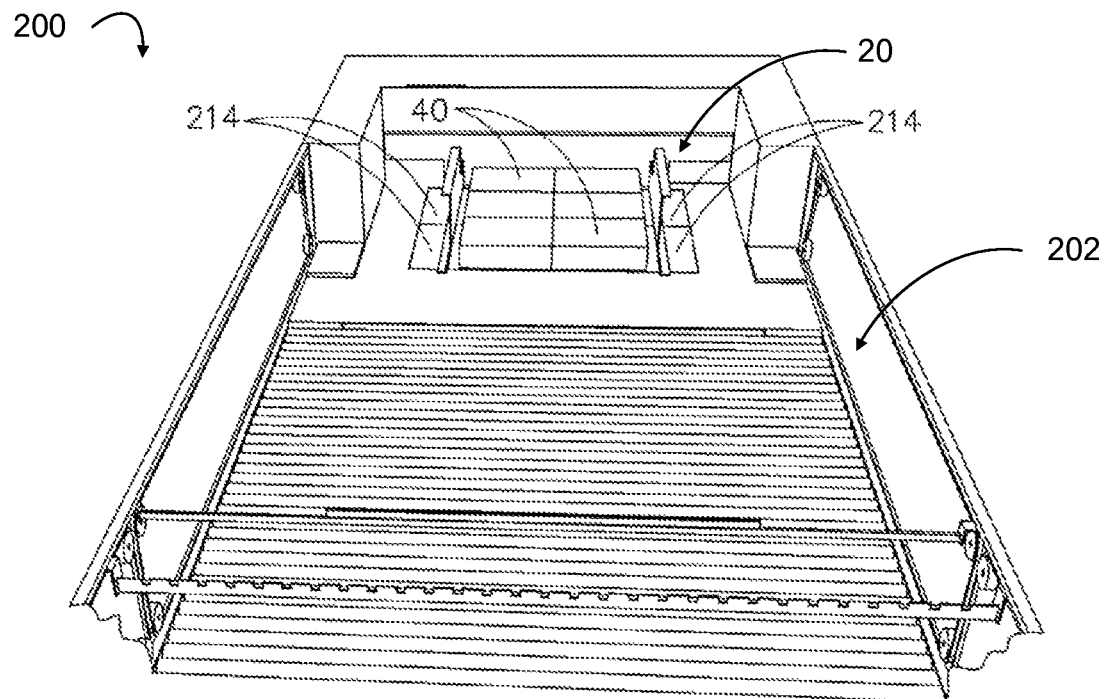
FIG. 6 is an isometric view of an upper level of the automatic palletizer of FIG. 1 showing a plurality of articles placed and aligned on top of a pair of doors.
Figure 7:
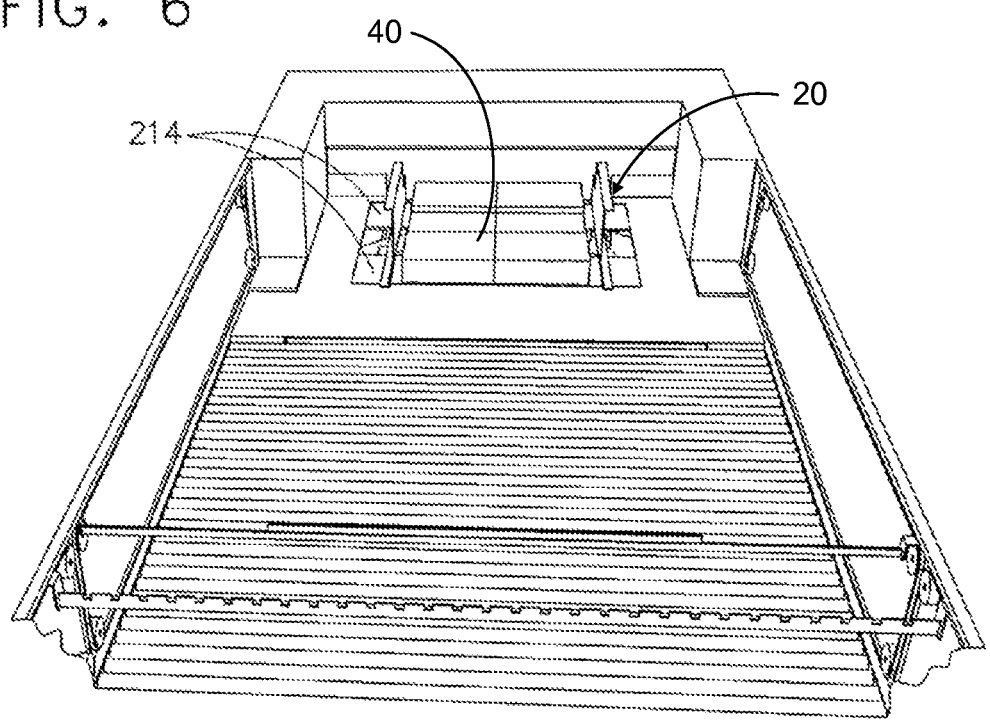
FIG. 7 is an isometric view of the automatic palletizer of FIG. 1 showing the doors opening to drop the central portion of articles onto a palletized load.

FIGS. 1, 6, 7, 8, and 9 will now be referred to describe the operation of automatic palletizer 200. Turning to FIG. 6, an isometric view of upper level 202 of automatic palletizer 200 is shown with a plurality of articles 40 placed and aligned on top of doors 214. While the number of articles 40 on a layer differs from FIGS. 1-5, the operation of automatic palletizer 200 is the same. Turning to FIG. 7, doors 214 over elevator shaft 210 (FIG. 1) are opened a sufficient amount to drop the central portion of articles 40 on top of palletized load 20 located just beneath doors 214. In FIG. 8, doors 214 are fully opened and the remaining articles 40 have dropped on top of palletized load 20. In this position, articles 40 are stabilized on top of palletized load 20. With palletized load 20 paused in this position, one or more of stabilizer appliers 50 are actuated to place load stabilizers 100 (FIG. 1) onto palletized load 20 (see FIG. 5) while upper articles 40 are in upper level 202 of automatic palletizer 200.

Figure 9:
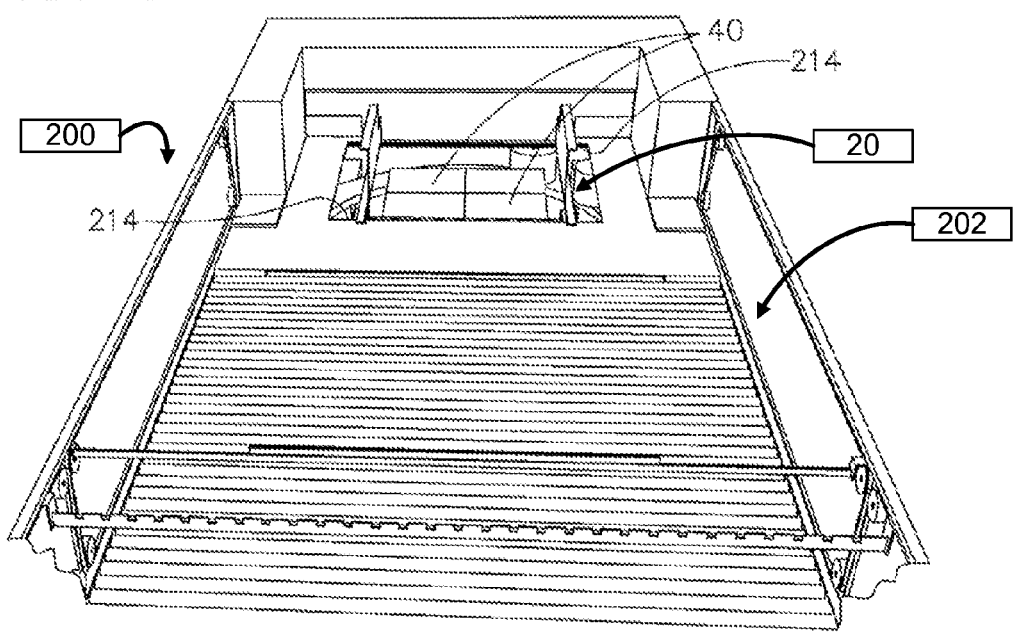
FIG. 9 is an isometric view of the automatic palletizer of FIG. 1 showing the palletized load lowered below the doors.
Figure 10:
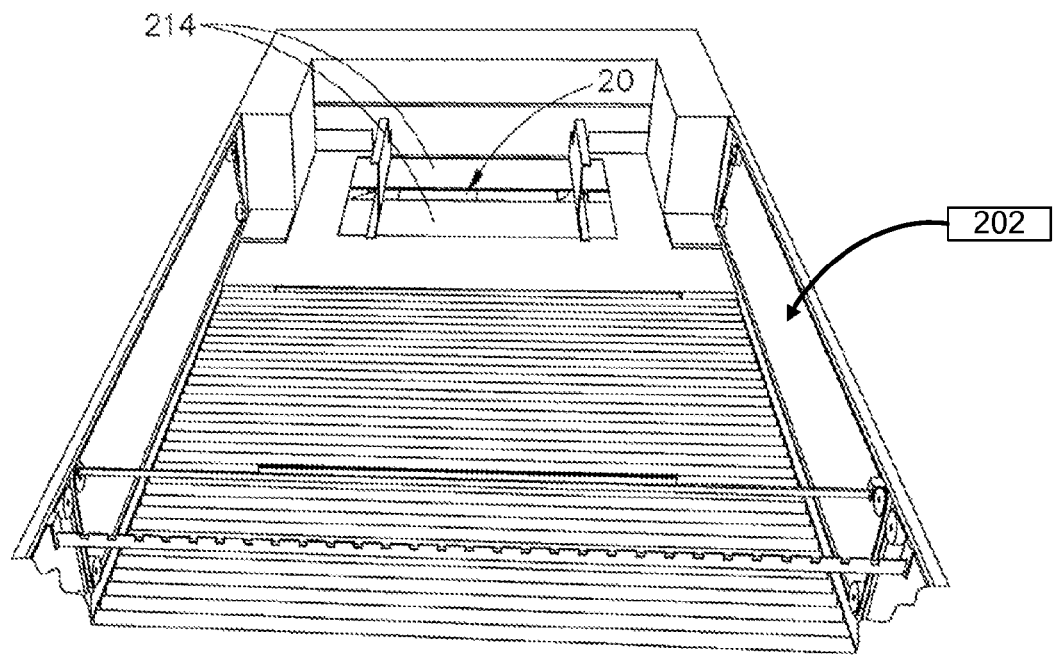
FIG. 10 is an isometric view of the automatic palletizer of FIG. 1 showing the doors in a closed position over the palletized load.

Turning to FIG. 9, palletized load 20 is dropped below doors 214 and into lower level 204 (FIG. 1) of automatic palletizer 200 and elevator 208 (FIG. 11) is paused. In another embodiment, load stabilizers 100 (FIG. 1) can be dropped down from upper level 202 to extend at least partly into lower level 204 (FIG. 1) to apply load stabilizers 100 (FIG. 1) onto palletized load 20. Doors 214 are then closed to receive another pallet 28 (FIG. 1) and/or layer of articles 40 (FIG. 9), as shown in FIG. 10.

Figure 11:
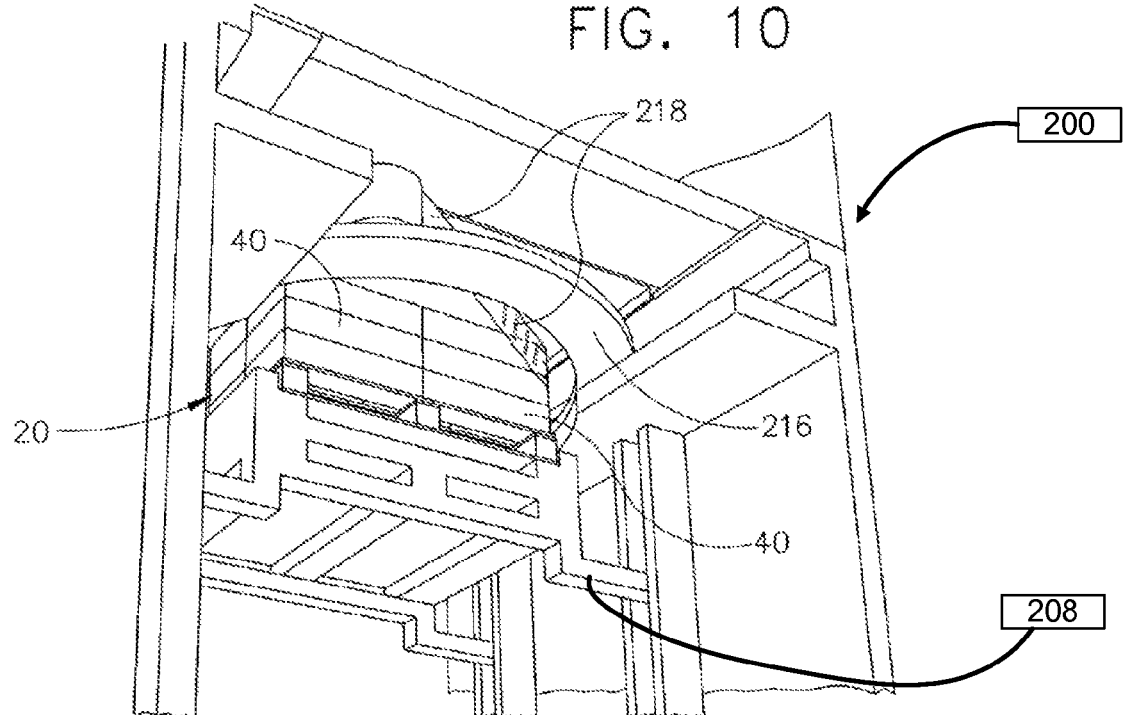
FIG. 11 is a fragmentary isometric view of the automatic palletizer of FIG. 1 showing the palletized load being wrapped.

FIG. 11 is a fragmentary isometric view of palletized load 20 being wrapped by wrap ring 216. While palletized bags are shown, any article 40 may be palletized. Once the desired amount of articles 40 and load stabilizers 100 (FIG. 1) are placed on palletized load 20, elevator 218 moves downward as pallet wrap 208 is rotatably wrapped around palletized load 20 by wrap ring 216. Once palletized load 20 is wrapped, elevator 208 moves downward to align and move the stabilized palletized load 20 onto discharge conveyor 206 (FIG. 1). Automatic palletizer 200 then repeats the process as many times as is necessary to palletize a delivery for transit.

Figure 12:
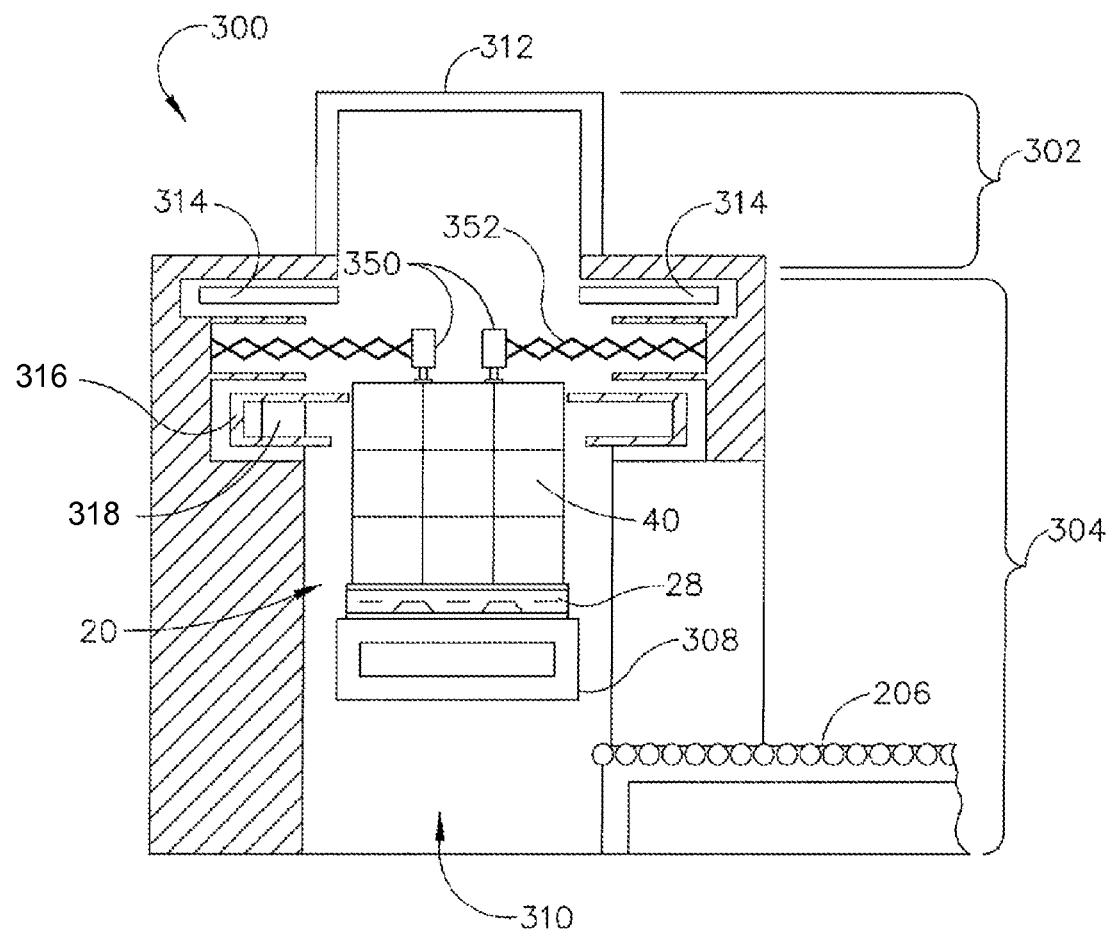
FIG. 12 is a partial cross sectional view of another example automatic palletizer.

Another example automatic palletizer 300 is shown in FIG. 12. Automatic palletizer 300 is similar to automatic palletizer 200 (FIG. 1) in that automatic palletizer 300 comprises an upper level 302 and a lower level 304 separated by movable doors 314. Lower level 304 is similar to lower level 204 (FIG. 1) and is configured to discharge articles 40 as palletized load 20 via discharge conveyor 206.

Upper level 302 is similar to upper level 202 and is configured to receive and align a plurality of articles 40. Accordingly, articles 40 are positioned on pallet 28 on elevator 308 within elevator shaft 310, load stabilizers 100 (FIG. 1) are applied by stabilizer applier assemblies 350, and palletized load 20 is wrapped with pallet wrap 318 by wrap ring 316. Stabilizer applier assemblies 350 are similar to stabilizer appliers 50. Alternatively, stabilizer applier assemblies 350 are mounted to a side surface of automatic palletizer 300 instead of framework 312.

Stabilizer applier assemblies 350 are positioned within lower level 304 and extend laterally within elevator shaft 310 to apply load stabilizers 100 to palletized load 20. As shown in FIG. 12, stabilizer applier assemblies 350 are coupled with a side surface of elevator shaft 310 by extendable arms 352. When extendable arms 352 are in a retracted position, stabilizer applier assemblies 350 are retracted within elevator shaft 310 such that elevator 308 is free to move past stabilizer applier assemblies 350. When extendable arms 352 are in an extended position, as shown in FIG. 12, stabilizer applier assemblies 350 are positioned above palletized load 20 such that stabilizer applier assemblies 350 are able to apply load stabilizers 100 to a top surface of palletized load 20 as described above. Other suitable configurations for automatic palletizer 300 will be apparent to one with ordinary skill in the art in view of the teachings herein.

The foregoing description of an embodiment has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. Although only a limited number of embodiments of the invention are explained in detail, it is to be understood that the invention is not limited in its scope to the details of construction and arrangement of components set forth in the preceding description or illustrated in the drawings. The invention is capable of other embodiments and of being practiced or carried out in various ways. Also, specific terminology had been used for the sake of clarity. It is to be understood that each specific term includes all technical equivalents which operate in a similar manner to accomplish a similar purpose. It is intended that the scope of this provisional filing will be better defined by the claims submitted with a later non-provisional filing.

The invention claimed is:

1. A device for palletizing a plurality of articles and for stabilizing selected ones of the plurality of articles, the device comprising:
   an upper level for receiving the plurality of articles;
   an elevator movable within an elevator shaft, wherein the elevator is configured to receive a pallet and the plurality of articles; at least one door movable to stack the plurality of articles from the upper level onto the pallet in a palletized load; and
   a stabilizer applier assembly attached to a side of the elevator shaft in a lower level below the at least one door, the stabilizer applier assembly comprising:
      at least one feeder configured to feed at least one load stabilizer, the at least one load stabilizer comprising an adhesive layer; and at least one stabilizer applier configured to receive the at least one load stabilizer, wherein the at least one stabilizer applier is configured to apply the adhesive layer of the at least one load stabilizer to a top surface of at least two articles of the plurality of articles of the palletized load.

2. The device of claim 1, wherein each load stabilizer comprises the respective adhesive layer coupled with the respective stabilizer sheet.

3. The device of claim 1, wherein each load stabilizer comprises the respective stabilizer sheet, the respective adhesive layer and a liner releasably coupled with the respective adhesive layer.

4. The device of claim 1, wherein the plurality of load stabilizers are coupled with an elongated liner.

5. The device of claim 4, wherein the at least one feeder is configured to peel the elongated liner away from each respective load stabilizer prior to applying the respective load stabilizer to the palletized load.

6. The device of claim 5, wherein the at least one feeder comprises a feed roll configured to store the elongated liner with the plurality of load stabilizers coupled thereto.

7. The device of claim 4, wherein the at least one feeder comprises a peel bar, wherein the elongated liner is disposed around the peel bar so that as the elongated liner is advanced around the peel bar each respective load stabilizer is peeled away from the elongated liner.

8. The device of claim 7, wherein the at least one feeder comprises a drive pulley operable to advance the elongated liner around the peel bar, and to store the elongated liner after load stabilizers have been removed from the elongated liner.

9. The device of claim 1, wherein each respective load stabilizer is coupled to at least one liner and wherein the at least one stabilizer applier is configured to receive each respective load stabilizer after each respective load stabilizer has been substantially removed from the at least one liner.

10. The device of claim 9, wherein the at least one stabilizer applier comprises a vacuum pad to maintain the position of each respective load stabilizer the at least one stabilizer applier has received.

11. The device of claim 1, comprising extendable arms operable to move the at least one stabilizer applier relative to the palletized load.

12. The device of claim 11, wherein the at least one stabilizer applier is configured to apply each respective load stabilizer to a current top surface of the palletized load received on the elevator beneath the at least one door.

13. The device of claim 1, wherein the at least one load stabilizer comprises a liner releasably coupled with the adhesive layer.

14. The device of claim 13, wherein the liner comprises an elongated strip configured to receive a plurality of load stabilizers.

15. The device of claim 1, wherein the at least one stabilizer applier is configured to apply the at least one load stabilizer to a side surface of the at least two articles in addition to the top surface.

16. A method for operating a device for palletizing a plurality of articles and for stabilizing selected ones of the plurality of articles, the method comprising:
aligning the plurality of articles into a layer of articles on at least one door on an upper level of a palletizer;
stacking the layer of articles onto a pallet received on an elevator in an elevator shaft of a lower level of the palletizer to provide a palletized load by opening the at least one door; and
actuating a stabilizer applier assembly attached to a side of the elevator shaft in the lower level below the at least one door to adhere a load stabilizer to a top surface of at least two articles of the plurality of articles of the palletized load;
wherein the at least one stabilizer applier is configured to apply the at least one load stabilizer to a top surface of the at least two articles.

17. The method of claim 16, wherein the at least one stabilizer comprises a releasable liner, and wherein actuating the stabilizer applier comprises peeling the releasable liner from the load stabilizer prior to adhering the one load stabilizer to the palletized load.

18. The method of claim 16, wherein actuating the stabilizer applier comprises applying adhesive to the at least two articles and applying a load stabilizer to the at least two articles.

* * * * *